US009280909B2

(12) United States Patent
Bober et al.

(10) Patent No.: US 9,280,909 B2
(45) Date of Patent: *Mar. 8, 2016

(54) STATIONARY HYDRAULICALLY ASSISTED DEVICE TO TEACH MOTORCYCLE RIDING SKILLS WHILE UNDER A CONTROLLED SUPERVISED ENVIRONMENT

(71) Applicants: Paul Michael Bober, Glendale, AZ (US); David M. Duncan, New River, AZ (US)

(72) Inventors: Paul Michael Bober, Glendale, AZ (US); David M. Duncan, New River, AZ (US)

(73) Assignee: Paul Michael Bober, Glendale, AZ (US)

( * ) Notice: Subject to any disclaimer, the term of this patent is extended or adjusted under 35 U.S.C. 154(b) by 385 days.

This patent is subject to a terminal disclaimer.

(21) Appl. No.: 13/868,828

(22) Filed: Apr. 23, 2013

(65) Prior Publication Data

US 2014/0315157 A1    Oct. 23, 2014

(51) Int. Cl.
*G09B 9/058*    (2006.01)

(52) U.S. Cl.
CPC ........................... *G09B 9/058* (2013.01)

(58) Field of Classification Search
USPC .............................................. 434/61
See application file for complete search history.

(56) References Cited

U.S. PATENT DOCUMENTS

| | | | | |
|---|---|---|---|---|
| 3,940,978 A | * | 3/1976 | Akkerman et al. | 73/116.09 |
| 4,978,300 A | * | 12/1990 | Letovsky | G09B 9/058 434/61 |
| 6,733,294 B2 | * | 5/2004 | Tuluie | G09B 9/058 434/61 |
| 2005/0091018 A1 | * | 4/2005 | Craft | 703/8 |

* cited by examiner

*Primary Examiner* — Robert J Utama
*Assistant Examiner* — Elroy S Crocker

(57) ABSTRACT

Some embodiments provide a hydraulically assisted stationary motorcycle training device for teaching motorcycle riding skills in a controlled and supervised environment. In some embodiments, the stationary motorcycle training device includes a set of equipment for responding to operations of a motorcycle positioned on the stationary motorcycle training device. In some embodiments, the stationary motorcycle training device is hydraulically assisted for simulating a motorcycle riding experience to a person seated on the motorcycle. includes a set of operational motorcycle equipment for learning motorcycle riding skills.

7 Claims, 6 Drawing Sheets

STATIONARY HYDRAULICALLY ASSISTED DEVICE TO TEACH MOTORCYCLE RIDING SKILLS WHILE UNDER A CONTROLLED SUPERVISED ENVIRONMENT

CLAIM OF BENEFIT TO PRIOR APPLICATION

This application claims benefit to U.S. Provisional Patent Application No. 61/687,621, entitled "Sierra trainer simulator," filed Apr. 30, 2012. The U.S. Provisional Patent Application No. 61/687,621 is incorporated herein by reference.

BACKGROUND

Riding a motorcycle requires a great amount of knowledge to effectively operate any of several different controls. Additionally, a strong kinesthetic sense of motorcycle dynamics must be developed and honed for riders to perform any of several different motorcycle maneuvers. Typically people who would like to learn to ride motorcycles lack both the knowledge and physical awareness necessary to safely learn motorcycle riding skills. In particular, new or novice motorcycle riders have not yet experienced or do not know how to shift, turn, lean, counter weight, or counter-steer as these things cannot be experienced by driving multiple-track vehicle (e.g., a car with a pair of wheels on each of two sides of the car). This lack of experience makes for a steep and dangerous learning curve as well as heightened stress levels by the student rider. The elevated stress levels make for a diminished learning situations. Therefore, a variety of motorcycle riding instruction is available for learning and/or improving motorcycle riding skills, including visual instruction media and live teacher-based instruction.

While general knowledge of motorcycle operation using a set of controls is readily available and easily absorbed from visual instruction media (e.g., books, video, animations, etc.), it is exceedingly difficult for a person to develop a physical sense of riding a motorcycle by merely viewing visual instruction media. For instance, a person can read a motorcycle instruction manual to learn to rotate the motorcycle's handlebar grip upward to accelerate and downward to decelerate. However, many motorcycle riding maneuvers would appear to be illogical and counter-intuitive if merely read in a motorcycle riding instruction manual (or for that matter, viewed in a video, etc.). The difficulty of expressing a set of instructions for executing a safe motorcycle maneuver is somewhat akin to the difficulty many sick patients have in describing how sick they feel (e.g., on a scale of 0-10, how sick do you feel?). A sick person simply has a sense that they are sick, but quantifying that feeling would is an absurd oversimplification that fails to express any meaningful information. Likewise, a book or video cannot teach a person how it feels to properly lean into a turn or come to a quick and complete stop.

Thus, many people learn motorcycle riding skills with a live instructor who sits on the motorcycle with a student during an instructional session that typically occurs outside on a paved street or parking lot. Although it is possible to acquire some tactile sense of motorcycle dynamics in this instructional way, there are a variety of problems that make this approach problematic for many people. In particular, the learning environment is often an uncontrolled outdoor environment that is prone to weather and natural phenomenons (e.g., a sudden rainfall occurs making the pavement slick and unsafe, the wind blows dust into a student rider's face, etc.). Furthermore, the outdoor learning environment may be unsuited for particular motorcycle maneuvers (e.g., parking lot is too small to ride the motorcycle at normal street speeds, etc.). Thus, the instruction provided by live teachers in outdoor learning environments is often inadequate. This is problematic for people who can learn about the different controls of a motorcycle through books, video, and/or instruction, but who cannot acquire an adequate kinesthetic riding sense that concrete tactile stimulation provides.

To date, these problems have not been resolved. The U.S. Pat. No. 4,978,300, issued to Letovsky et al. ("Letovsky"), discloses a motorcycle simulator that provides six degrees of movement freedom to realistically simulate a high performance motorcycle during operation. However, Letovsky's simulator includes a non-operational frame of a motorcycle and none of the components are included to hydraulically assist in simulating the riding experience. U.S. Pat. No. 3,686,776, issued to Dahl, describes a motorcycle riding simulator. However, the simulator disclosed in Dahl uses a center post supporting structure and includes a treadmill-like rolling mat on which a motorcycle is placed for simulated operation. Thus, none of these references have disclosed a stationary hydraulically assisted motorcycle training device as provided in this specification.

BRIEF SUMMARY

Some embodiments of the invention provide a novel stationary hydraulically assisted motorcycle training device for teaching motorcycle riding skills in a controlled and supervised environment. In some embodiments, the motorcycle training device supports a motorcycle in a stationary upright position for learning motorcycle riding skills. In some embodiments, the motorcycle training device is hydraulically assisted to simulate a motorcycle riding experience for a person seated on the motorcycle. In some embodiments, the motorcycle training device includes a set of components that permit operation of the motorcycle within a set of operational constraints.

In some embodiments, the motorcycle training device uses a real operating motorcycle to simulate real motorcycle riding sensations. The motorcycle used in some embodiments of the training device is secured to a training deck of the device to teach motorcycle riding skills in a controlled and supervised environment. The motorcycle used with the motorcycle training device of some embodiments includes a full set of controls for operating the motorcycle in any training capacity. The motorcycle, in turn, provides operational responses to student-selected motorcycle maneuvers which give rise to physical sensations felt by the student.

BRIEF DESCRIPTION OF THE DRAWINGS

Having described the invention in general terms, reference is now made to the accompanying drawings, which are not necessarily drawn to scale, and wherein.

DETAILED DESCRIPTION

Figure 1:
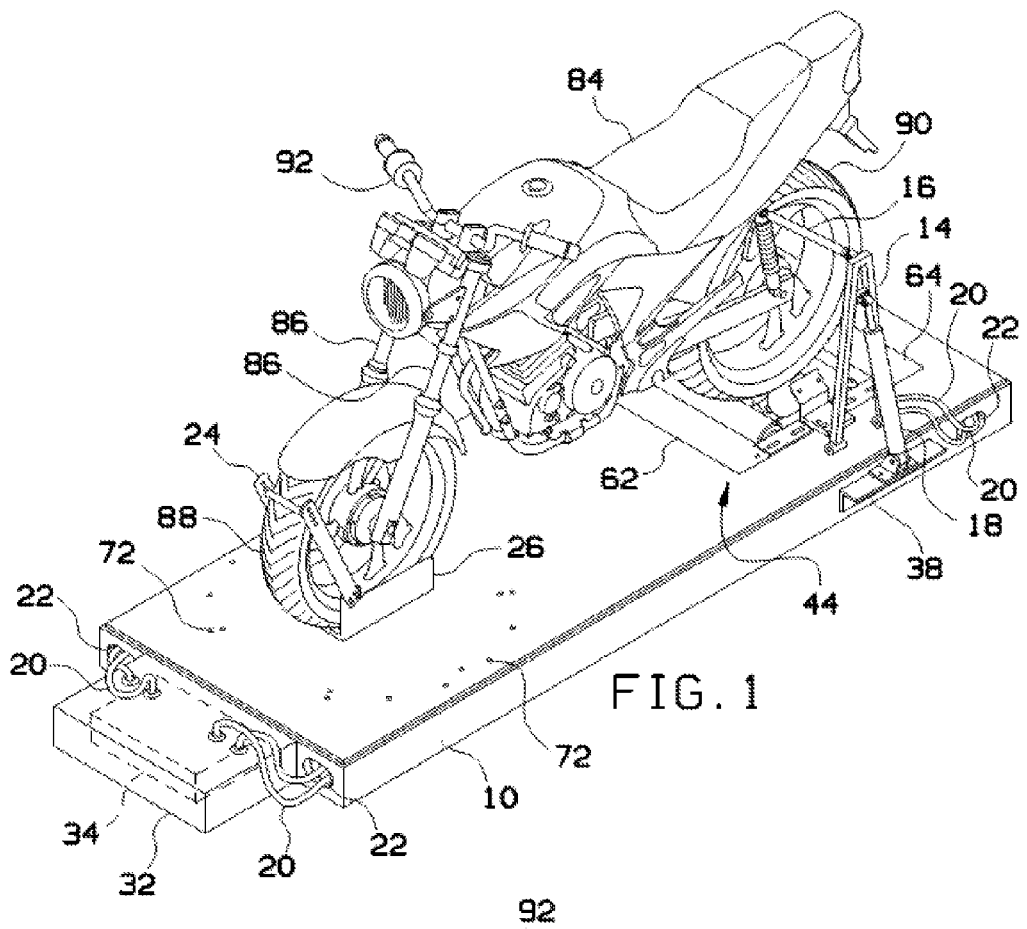
FIG. 1 conceptually illustrates a perspective view of an example stationary hydraulically assisted motorcycle training device of some embodiments with a motorcycle positioned for training usage on the training device.

In the following detailed description, several examples and embodiments of the invention are described. However, it will be clear to a person skilled in the art that the invention is not limited to the embodiments set forth and can be adapted for any of several other uses. For instance, many embodiments include examples that are described in relation to paved surface motorcycle training, yet the features of these embodiments are adaptable to many other single-track vehicles capable of achieving significant velocities (e.g., mopeds, racing bikes, dirt bikes, etc.).

Some embodiments of the invention provide a novel stationary hydraulically assisted motorcycle training device for teaching motorcycle riding skills in a controlled and supervised environment. In some embodiments, the motorcycle training device supports a motorcycle in a stationary upright position for learning motorcycle riding skills. In some embodiments, the motorcycle training device is hydraulically assisted to simulate a motorcycle riding experience for a person seated on the motorcycle. In some embodiments, the motorcycle training device includes a set of components that permit operation of the motorcycle within a set of operational constraints.

In some embodiments, the motorcycle training device uses a real operating motorcycle to simulate real motorcycle riding sensations. The motorcycle used with the motorcycle training device of some embodiments includes a full set of controls for operating the motorcycle in any training capacity. In addition, the motorcycle training device of some embodiments is hydraulically assisted to provide a simulated sense of inertial forces that arise naturally from motorcycle maneuvers of a non-stationary motorcycle. However, the motorcycle used in these embodiments of the training device is secured to the training deck of the device to teach motorcycle riding skills in a controlled supervised environment. With these operational features and constraints, the student motorcycle rider can practice any of several motorcycle maneuvers (e.g., fast and slow accelerating and decelerating, controlled turning, high speed turning, etc.) in a controlled environment that can be supervised by an instructor.

The motorcycle, in turn, provides operational responses to student-selected motorcycle maneuvers. These operational responses give rise to physical sensations which when felt by a student can enhance the student's intellectual understanding and kinesthetic sense of motorcycle dynamics. In this way, when the motorcycle is operated in a particular way (e.g., steering at a not insignificant speed), the student is able to experience physical sensations that arise from operating the motorcycle in the particular manner. For example, a student attempting to steer a motorcycle left while maintaining a speed of approximately 25 MPH may intuitively believe that negotiating this maneuver successfully involves simply turning the handlebars to face slightly to the left. In this example, the student would experience great difficulty leaning into the turn, and may ultimately fail to steer the motorcycle left. Upon experiencing the difficulty in steering this way, the student's instructor could then teach the student a technique for making the turn, such as counter steering. As counter steering involves an initial handlebar movement that is counter-intuitive (i.e., turning the handlebars slightly right to steer to the left), most students would not think of doing it, and even if instructed to do so by a motorcycle riding instructor, most students would be hesitant to even try such a maneuver in an uncontrolled environment (e.g., an actual paved street or parking lot).

FIG. 1 conceptually illustrates a perspective view of an example stationary hydraulically assisted motorcycle training device of some embodiments. In this example, a motorcycle is positioned upright on and secured to a training deck of the motorcycle training device so that an instructor not seated on the motorcycle can teach motorcycle riding skills to a student seated on the motorcycle.

The example motorcycle training device illustrated in FIG. 1 includes a training deck 10, a set of rear control arms 14, a set of struts 16, a set of hydraulic cylinders 18, a plurality of hydraulic lines 20, a plurality of hydraulic line cutouts 22, a set of adjustable wheel safety arms 24, a front wheel chock 26, a hydraulic tank 32, a control system 34, a set of deck hydraulic cylinder mounting brackets 38, a rear roller assembly 44, front and rear removable deck plates 62 and 64, a set of turntable mounting ring screw holes 72, a motorcycle 84, a set of motorcycle front forks 86, a motorcycle front tire 88, a motorcycle rear tire 90, and a set of motorcycle handlebars 92.

The motorcycle 84 used with the motorcycle training device in some embodiments is a fully-functional motorcycle with a full set of operational controls. The motorcycle 84 further includes a set of motorcycle front forks 86, front and rear motorcycle tires 88 and 90, respectively, and the set of motorcycle handlebars 92. In some embodiments, any type of motorcycle can be used with the motorcycle training device. For instance, the motorcycle can be a street motorcycle, a racing motorcycle, an off-road motorcycle, or any other type of single-track motorcycle.

The training deck 10 in some embodiments of the motorcycle training device provides a mounting surface for all components of the training device. In some embodiments, the training deck 10 includes an engineered framework of dimensional rectangular steel tubing welded to form a large rectangle with internal bracing. The corners and joints in some embodiments are engineered for strength and rigidity. In some embodiments, strength and rigidity is provided by a set of welded compound miter joints used for the corners and joints of the training deck 10. On top of the steel framework of the training deck 10 is a metallic-based plate. In some embodiments, the metallic-base plate is one of a solid piece of steel and a nonskid diamond plate aluminum plate fastened to the steel frame work. In some embodiments where the training deck 10 is steel, the training deck 10 is weld fastened to the steel frame work. In embodiments where the training deck 10 is nonskid diamond plate aluminum, the training deck 10 is mechanically fastened to the steel frame work. However, the training deck 10 can be any size and can include any makeup and composition of materials that is sufficient to support an operating motorcycle and a set of motorcycle training device components.

The training deck 10 includes several turntable mounting ring screw holes 72 for mounting a front-wheel turntable in some embodiments. In addition, the training deck 10 includes several hydraulic line cut outs 22 through which hydraulic lines 20 are run up to the hydraulic cylinders 18. The hydraulic lines 20 also run down through the hydraulic line cut outs 22 and under the training deck 10. In some embodiments, the hydraulic lines 20 run under the deck all the way to the front of the deck where the hydraulic tank 32 is positioned.

The hydraulic lines 20 run through one or more sides of the hydraulic tank 32 in some embodiments to the control system 34. In some embodiments, the control system 34 is embedded within the hydraulic tank 32. The control system 34 of some embodiments is an electronic/hydraulic control system. The control system in these embodiments comprises a fluid reserve tank to hold hydraulic fluid, and an electric pump motor shaft that drives the physically coupled hydraulic pump. The pressurized fluid flows to a hydraulic distribution block with two 2-way portioning valves. These two 2-way portioning valves are connected to the hydraulic struts 16 with high pressure hydraulic fluid lines 20.

The motorcycle 84 is positioned securely on the training deck 10 in some embodiments by the front wheel turret assembly 94, while the rear of the motorcycle is attached to the set of rear control arms 14 and the set of struts 16 in order to spin the rear wheel when power is applied. In some embodiments, the set of struts 16 comprise electronically controlled hydraulic struts. The electronically controlled hydraulic struts secure the motorcycle 84 to the training deck 10 by physically fastening the struts 16 to the training deck 10 and to the motorcycle frame. The electronically controlled hydraulic struts 16 assist with or retard the leaning motion of the rear of the motorcycle in some embodiments.

Although not visible in the example motorcycle training device illustrated in FIG. 1, the set of hydraulic cylinders 18 comprises two controlled hydraulic two-way cylinders. Each cylinder is mounted to a deck hydraulic cylinder mounting bracket 38 on one side of the training deck 10 and then to the rear of the matching side of the motorcycle 84.

The front wheel turret assembly 94 is mounted to the training deck 10 in some embodiments to secure the front wheel 88 of the motorcycle 84 to the training device. As mounted, the front wheel turret assembly 94 of some embodiments provides a limiting safety factor and permits a person to turn and/or lean the front of the motorcycle. In some embodiments, the turret assembly comprises the set of adjustable wheel safety arms 24 and the front wheel chock 26. The front turret assembly consists of a height and width adjustable wheel retention safety strap that secure over the top of the front tire of the motorcycle. The wheel retention safety strap is bolt fastened to an adjustable wheel chock. The adjustable wheel chock 26 is width adjustable to accommodate different thicknesses of different wheels. The adjustable wheel chock 26, with wheel retention safety strap bolt fastened to it, is welded to the top half of a multi-directional swivel joint. The bottom half of the multi-directional swivel joint is welded to a steel shaft with machined smooth surfaces with a threaded end. The completed steel shaft assembly is inserted into a machined bearing housing that is fitted with weight distributing tapered roller bearings on top and bottom with matching grease seals. The bottom threaded part of the machined shaft, with a retention nut securing the steel shaft to the inside of the machined bearing housing, acts as a tension-providing device.

The rear roller assembly 44 of some embodiments allows the motorcycle to have the rear tire rotate at speed and simulate forward motion. Additionally, the rollers allow the rear wheel 90 to generate gyroscopic stability, while the wheel 90 is under power. In some embodiments, the rear roller assembly 44 comprises two horizontal non-resistant (NR) high speed rollers spaced equidistant from a pair of angle mounted NR high speed rollers. All of the NR high speed rollers are mounted to high speed bearings. The NR roller/high speed bearing assemblies in some embodiments are hard mounted to custom-made angle brackets. Each NR roller/high speed bearing assembly angle bracket bolts into a carriage assembly. The carriage assembly is the carrier for the NR rollers/bearing assembly. The brackets are slotted to allow for maximum adjustments inside of the carriage assembly to compensate for different tire heights and widths. The carriage itself has slotted mounts to allow for maximum adjustment. The carriage slides along a rail with machined slots to accommodate different mounting positions. There are several A to D speed sensors affixed to the rollers to assist the computers with input with regards to speed, lean angle, and control.

While the above information describes several components of the example motorcycle training device described by reference to FIG. 1, the next example describes some of the operations of these components and elaborates on their relationships to each other.

Figure 2:
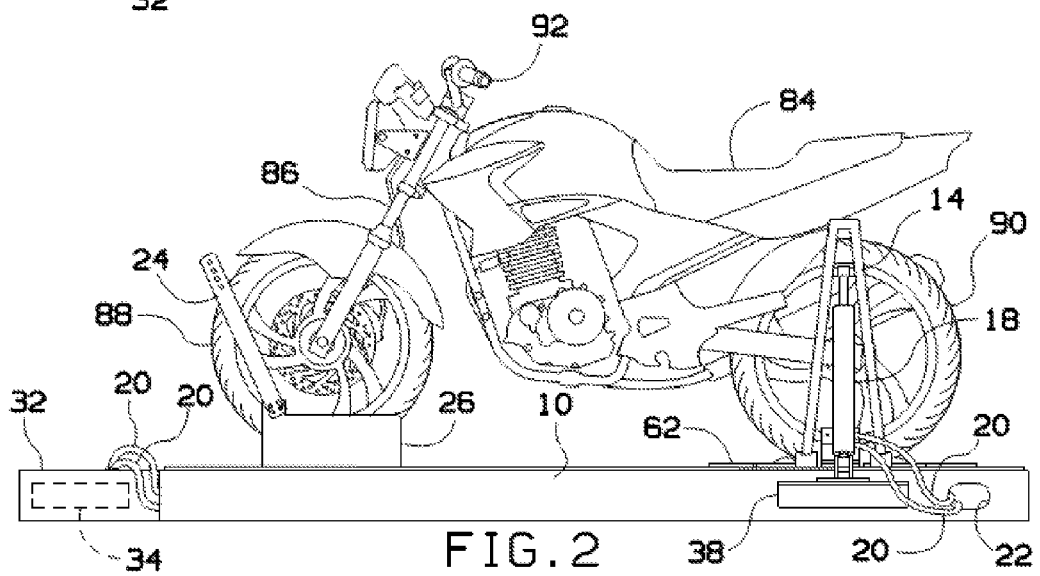
FIG. 2 conceptually illustrates a side view of the motorcycle and the example stationary hydraulically assisted motorcycle training device illustrated in FIG. 1.

FIG. 2 conceptually illustrates a side view of the motorcycle and the example stationary hydraulically assisted motorcycle training device illustrated in FIG. 1. As shown in FIG. 2, when the motorcycle 84 is securely mounted to the training deck 10, the motorcycle rests with the front wheel 88 controlled by the front wheel turret assembly 94. The rear tire 90 rests on the roller assembly 44 at the opposite end of the deck 10 with the rear of the motorcycle 84 restrained by the pair of motorcycle frame to training deck mounted hydraulic struts 16.

In some embodiments, learning of motorcycle riding skills commences when the rider of the motorcycle begins to apply power to the motorcycle rear wheel 90 by engaging the transmission of the motorcycle 84. After engaging the transmission, the motorcycle 84 produces gyroscopic stability due to the spinning of the rear wheel 90. The pair of hydraulic struts 16 control the rear of the motorcycle and assist in keeping the spinning rear wheel on the roller assembly 44.

When the secured front wheel 88 turns or leans in the front wheel turret assembly 94 as a result of rider input, the turret assembly 94 supports and controls the front of the motorcycle 84, mimicking the response of an unrestrained motorcycle front wheel. When the rider turns or leans the motorcycle 84 from the vertical position to a desired lean angle, the handlebar 92 controls sense the direction and movement of the handlebars 92. Based on the sensed direction and movement, the hydraulic pressure system and controls properly pressurize the correct portion of each of the pair of hydraulic cylinders 18 to support and/or control a predictable sustainable lean reaction. As the rider learns to initiate the desired maneuver, the spinning rear wheel transitions from a vertical position, one that is supported by the pair of horizontal opposed rollers 46, to an angled position based on the amount of lean that is supported by the adjustable angled rollers 48. The rear wheel 90, which has the movement assisted and/or controlled by the pair of motorcycle frame to deck mounted hydraulic struts 16, transitions smoothly from a vertical or static position to a stabilized lean angle position. In this way, the rider to able to learn and understand the finesse controls of the motorcycle and the dynamics of motorcycle riding. Once the training is over, or if there is a control issue, the hydraulic struts 16 return the motorcycle 84 to an upright vertical static position.

Because the training device uses a real running motorcycle to simulate real riding sensations while secured to the training deck in a controlled and supervised environment, a person who would traditionally learn motorcycle riding skills in an uncontrolled (e.g., outdoor) environment can now learn the basics of motorcycle riding and also can focus on specific challenging motorcycle maneuvers that are safer to learn in the controlled environment provided by the motorcycle training device described in this specification. Also, because the new or novice rider learns by giving an input to the motorcycle and immediately experiencing the directly related reaction on a real running motorcycle, the learning curve is much faster than in a traditional outdoor setting.

Furthermore, in terms of motorcycle riding instruction, there is a vast unserviced market of people with prosthetic limbs who are eager to learn how to ride and operate a motorcycle. The stationary hydraulically assisted motorcycle training device in some embodiments provides a sufficiently controlled and safe learning environment for people with any of several prosthetic devices. In the past, this market has gone largely unnoticed because teaching motorcycle riding skills to a person who had a prosthetic device had been feverishly difficult in uncontrolled (i.e., outdoor) teaching environments. Nevertheless, recent advances in prosthetic technology have provided many people with greater freedom of prosthetic movement. Thus, it is not entirely uncommon to see people with prosthetic devices involved in activities that had previously been virtually impossible to perform (e.g., lifting weights at a gym, hiking along a nature trail, jogging in the street, etc.). However, given the many challenges that been overcome due to improvements in prosthetic technology, many additional challenges remain. For instance, an improved prosthetic "knee" may be able to "bend" in a way that a human body-bound knee bends, yet the prosthetic knee may only support a certain amount of weight or force that is far less than a healthy human knee. Accordingly, precautions are still in order for most people with prosthetic limbs. By offering a controlled and supervised learning environment, however, people with prosthetic devices can begin to learn how to ride at a slower, more gentle pace that is suited to their particular physical needs. In this way, a person with a prosthetic device can learn how to ride a motorcycle before ever taking ride in an uncontrolled riding outdoor environment.

Figure 3:
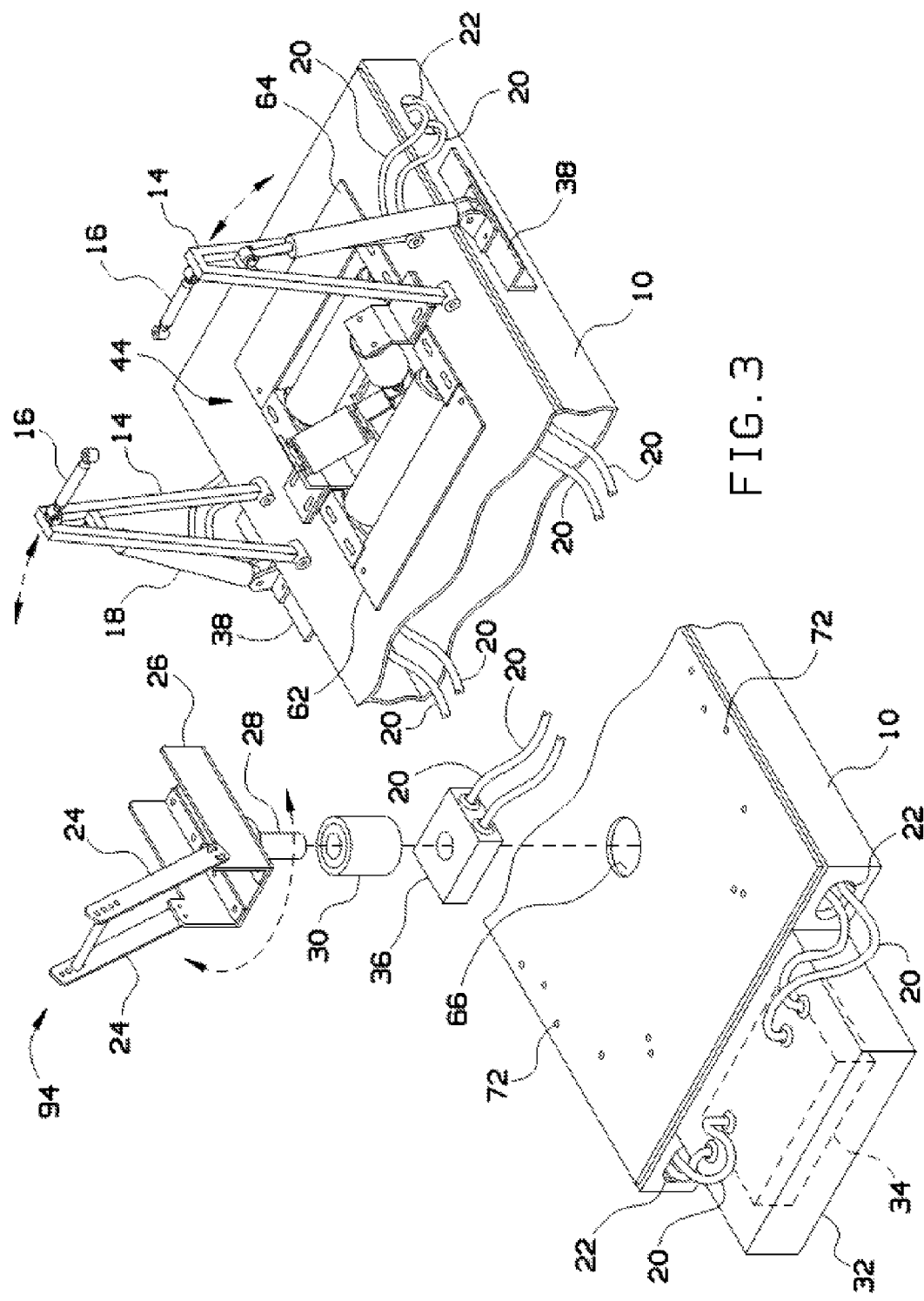
FIG. 3 conceptually illustrates a partially exploded perspective view of an example stationary hydraulically assisted motorcycle training device of some embodiments.

FIG. 3 conceptually illustrates a partially exploded perspective view of an example motorcycle training device of some embodiments. In this example, several components of the example motorcycle training device are described in relation to FIGS. 4-7.

The example motorcycle training device of FIG. 3 is similar to the example motorcycle training device illustrated in FIG. 1, except that in this figure some or all of the plurality of hydraulic lines 20 run under the training desk 10. In addition, the front wheel turret assembly is illustrated in a partially exploded perspective to reveal a plurality of additional components not described by reference to the front turret assembly of FIG. 1.

As shown, the front wheel turret assembly 94 of some embodiments comprises the set of adjustable wheel safety arms 24 and the front wheel chock 26. The adjustable wheel safety arms of some embodiments are bolt fastened to the front wheel chock 26. In some embodiments, the width of the wheel chock 26 is adjustable to accommodate different thicknesses of different motorcycle front wheels. The adjustable wheel chock 26 (with the adjustable wheel safety arms bolt fastened to it) is welded to the top half of a multi-directional swivel joint. The bottom half of the multi-directional swivel joint is welded to a steel shaft with machine smoothed surfaces and a threaded end. When welded, the swivel joint and steel shaft make completed steel pivot shaft/pin 28 assembly that is inserted into a bearing assembly 30. The bearing assembly of some embodiments comprises a machined bearing housing that is fitted with weight distributing tapered roller bearings on the top and bottom with matching grease seals. The steel shaft is secured to the inside of the machined bearing housing by a retention nut. The bottom threaded portion of the steel shaft acts as a tension-providing device.

In some embodiments, instead of a set of safety arms 24, the front wheel turret assembly 94 comprises a height and width adjustable wheel retention safety strap (not shown) that secures over the top of the front wheel 88 of the motorcycle 84.

While the components of the front wheel turret assembly 94 of the example motorcycle training device shown in FIG. 3 are described above in relation to one or more other components of the front wheel turret assembly and the motorcycle training device, the following example describes the operation and function of the front wheel turret assembly 94.

Figure 4:
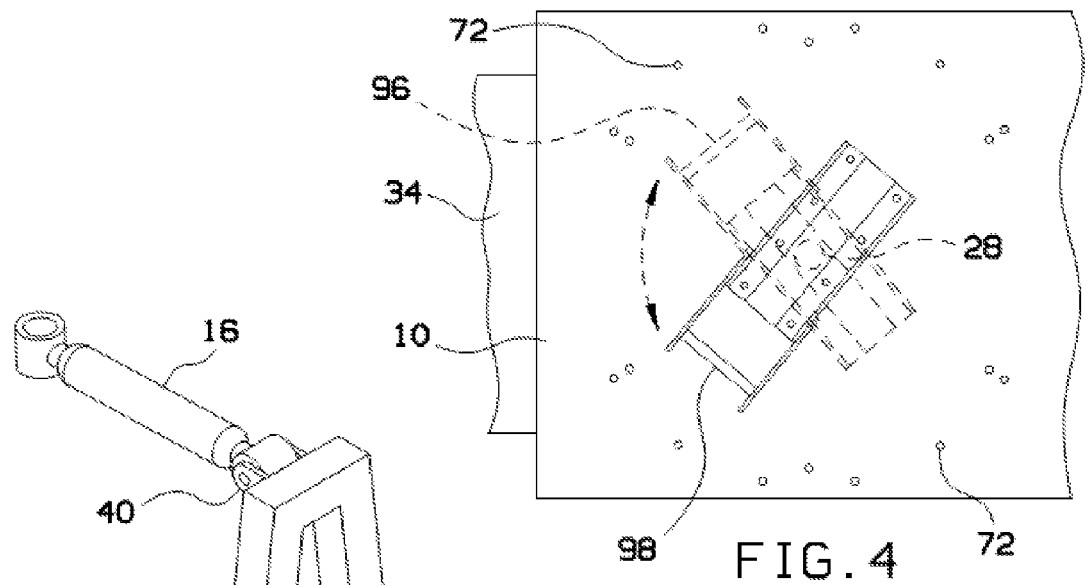
FIG. 4 conceptually illustrates a detailed top view of the front wheel turret assembly 94 rotation of the example stationary hydraulically assisted motorcycle training device illustrated in FIG. 3.

FIG. 4 conceptually illustrates a detailed top view of the front wheel turret assembly 94 with exemplary rotations of the example stationary hydraulically assisted motorcycle training device illustrated in FIG. 3. In this figure, the front wheel turret assembly 94 is shown rotated to the right 96 and rotated to the left 98 (as illustrated by the dashed arrow), while the front wheel is maintained at a pivot point associated with the steel pivot shaft/pin 28.

In this case, the steel pivot shaft/pin 28 assembly performs an essential holding function so that the rotation of the front wheel turret assembly 94 based on a person's movement of the handlebars 92 of the motorcycle 84 does not change the pivot point of the front wheel 88. In some embodiments, the steel pivot shaft/pin 28 assembly holds the front wheel turret assembly 94 at the same position in coordinate space while providing full rotation operations along a single axis. In particular, the machined bearing housing 30, which holds the steel shaft of the the steel pivot shaft/pin 28 assembly with the set of adjustable wheel safety arms 24, the wheel chock 26, and the multi-directional swivel joint, prevents the motorcycle from escaping the trainer as the machined bearing housing is welded to the underside surface of the training deck 10. The bottom retention nut, which secures the steel shaft to the inside of the machined bearing housing 30, acts as tension-providing device. The steel table turret acts to slow down the inertial reactions of a heavier motorcycle and provides a mounting surface for the front stabilizing safety arms 24.

Thus, when the person steers to the right (i.e., moves the handlebars to the right), the front wheel turret assembly 94 is rotated to the right 96 but not moved from its coordinate space position. Likewise, when the person steers to the left (i.e., moves the handlebars to the left), the front wheel turret assembly 94 is rotated to the left 98 but not moved from the position in coordinate space. Because the wheel turret assembly 94 can be rotated to the right and left to simulate motorcycle steering without moving the front wheel turret assembly 94 its coordinate space position (i.e., at the pivot point of the steel pivot shaft/pin 28), the operation of steering the front wheel is controlled and safe for a person learning to ride a motorcycle.

The rotation of the front wheel turret assembly 94 in some embodiments provides only a limited simulated motorcycle riding experience. In some embodiments of the motorcycle training device, the rear control arms 14 provide another set of movements for simulating a motorcycle riding experience. The following example describes the operation and function of the rear control arms 14 and other associated components.

Figure 5:
FIG. 5 conceptually illustrates a detailed perspective view of the rear control arm 14 of the example stationary hydraulically assisted motorcycle training device illustrated in FIG. 3. The rear control arm 14 shown in this figure is typical of all control arms present on a stationary hydraulically assisted motorcycle training device in some embodiments. Therefore, when reference is made to any of the control arms, the features of the rear control arm 14 described in this specification shall be understood to be representative of the referenced control arm.

FIG. 5 conceptually illustrates a detailed perspective view of a rear control arm 14 of the example stationary hydraulically assisted motorcycle training device illustrated in FIG. 3. The rear control arm 14 shown in this figure is typical of all control arms present on a stationary hydraulically assisted motorcycle training device in some embodiments. Therefore, when reference is made to any of the control arms, the features of the rear control arm 14 described in this specification shall be understood to be representative of the referenced control arm.

In some embodiments . . .

Figure 6:
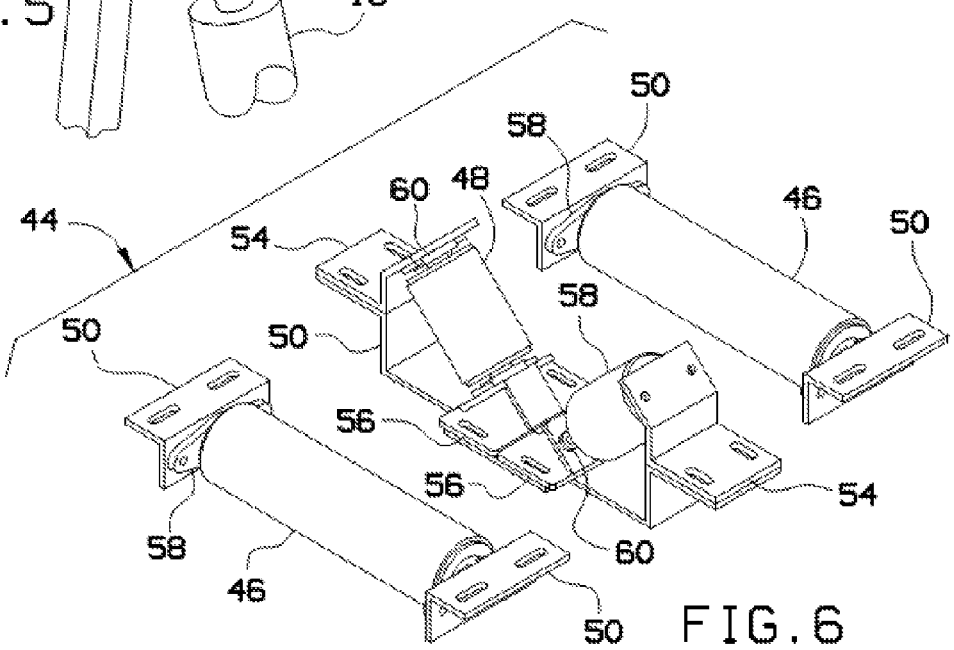
FIG. 6 conceptually illustrates a detailed perspective view of the rear roller assembly 44 of the example stationary hydraulically assisted motorcycle training device illustrated in FIG. 3.

FIG. 6 conceptually illustrates a detailed perspective view of the rear roller assembly 44 of the example stationary hydraulically assisted motorcycle training device illustrated in FIG. 3.

In some embodiments . . .

Figure 7:
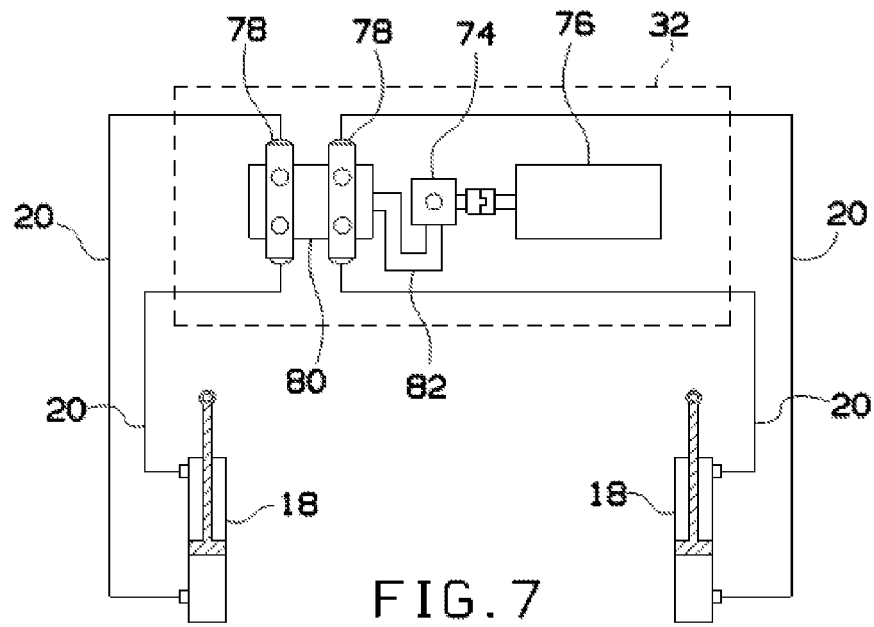
FIG. 7 conceptually illustrates a schematic view of a hydraulic system 34 in some embodiments of a stationary hydraulically assisted motorcycle training device.

FIG. 7 conceptually illustrates a schematic view of a hydraulic system 34 in some embodiments of a stationary hydraulically assisted motorcycle training device.

In some embodiments . . .

Figure 8:
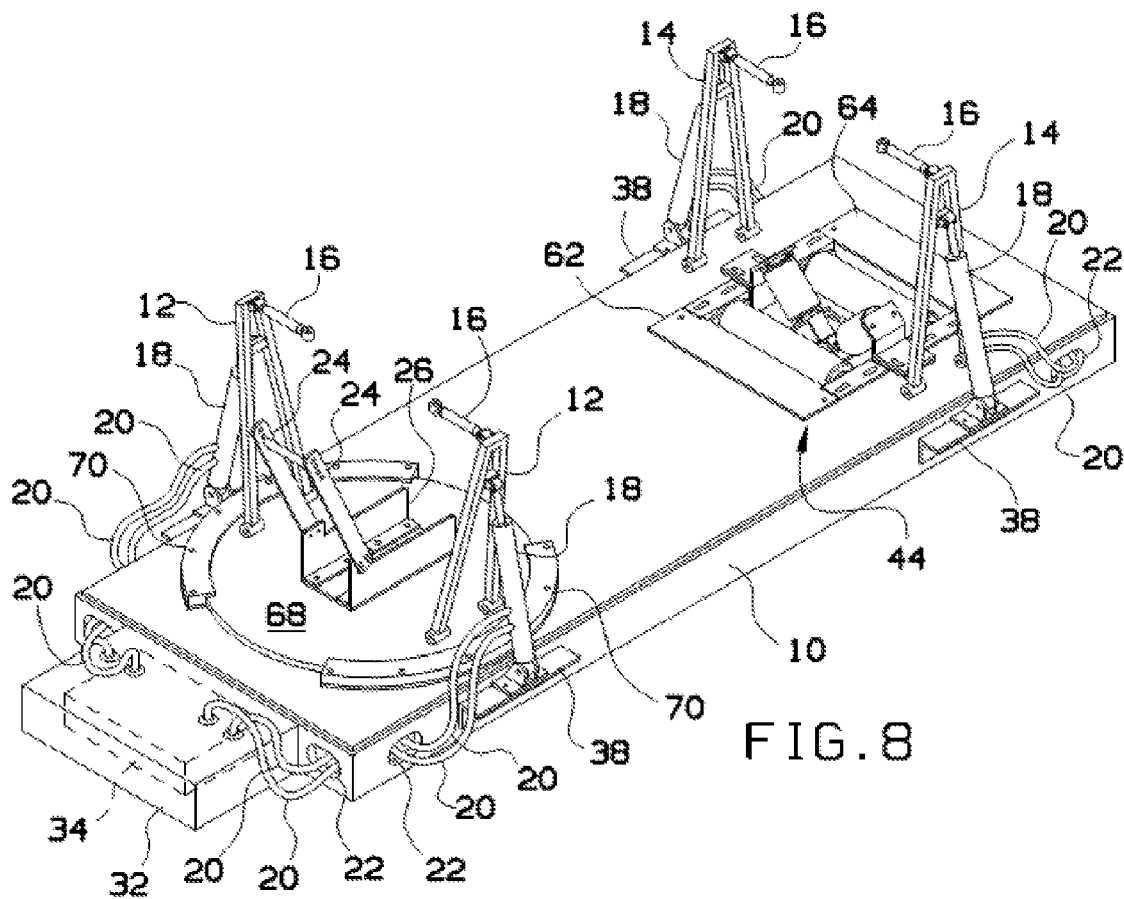
FIG. 8 conceptually illustrates a perspective view of an example stationary hydraulically assisted motorcycle training device having front and rear control arms and a turn table for simulated motorcycle riding in some embodiments. Like the stationary hydraulically assisted motorcycle training device illustrated in FIG. 5, the stationary hydraulically assisted motorcycle training device shown in this figure includes a set of rear control arms 14. In addition to the rear control arms, the motorcycle training device shown in this figure includes a set of front control arms 12, as well as a turn table 68 that is installed beneath the front control arms.

FIG. 8 conceptually illustrates a perspective view of an example stationary hydraulically assisted motorcycle training device having front and rear control arms and a turn table for simulated motorcycle riding in some embodiments. Like the stationary hydraulically assisted motorcycle training device illustrated in FIG. 5, the stationary hydraulically assisted motorcycle training device shown in this figure includes a set of rear control arms 14. In addition to the rear control arms, the motorcycle training device shown in this figure includes a set of front control arms 12, as well as a turn table 68 that is installed beneath the front control arms.

In some embodiments . . .

A

B

C

Alternative Embodiment

Two Person Riding Mode

"teaching two people on a motorcycle to ride" OK, that's a good adaptation to include. And it seems to fall squarely within the originally conceived invention (just adapted for two person). I will include this as another embodiment.

Alternative Embodiment

Weather Mode

Another embodiment I thought about over the weekend was an adaptation of the main invention to include a "weather mode" like artificially simulating a "wet surface" or "snow conditions". So for example, some kind of liquid or air stream under the tires, and in some cases, modifying the rear tire handling (e.g., slide out on an icy or wet surface, possibly some kind of simulated hydroplaning). The weather mode in my opinion is fully within the scope of the invention, although its implementation is not currently in production. So something like that I would include in passing ("In other embodiments, weather conditions are simulated by . . . ").

Alternative Embodiment

Terrain Mode

Another similar embodiment might be a "terrain mode" whereby different terrain is simulated (e.g., dirt path, paved road, etc.). Let me know if you think it's a reach to include the weather mode and/or terrain mode stuff.

In some embodiments . . .

A

B

C

Figure 9:
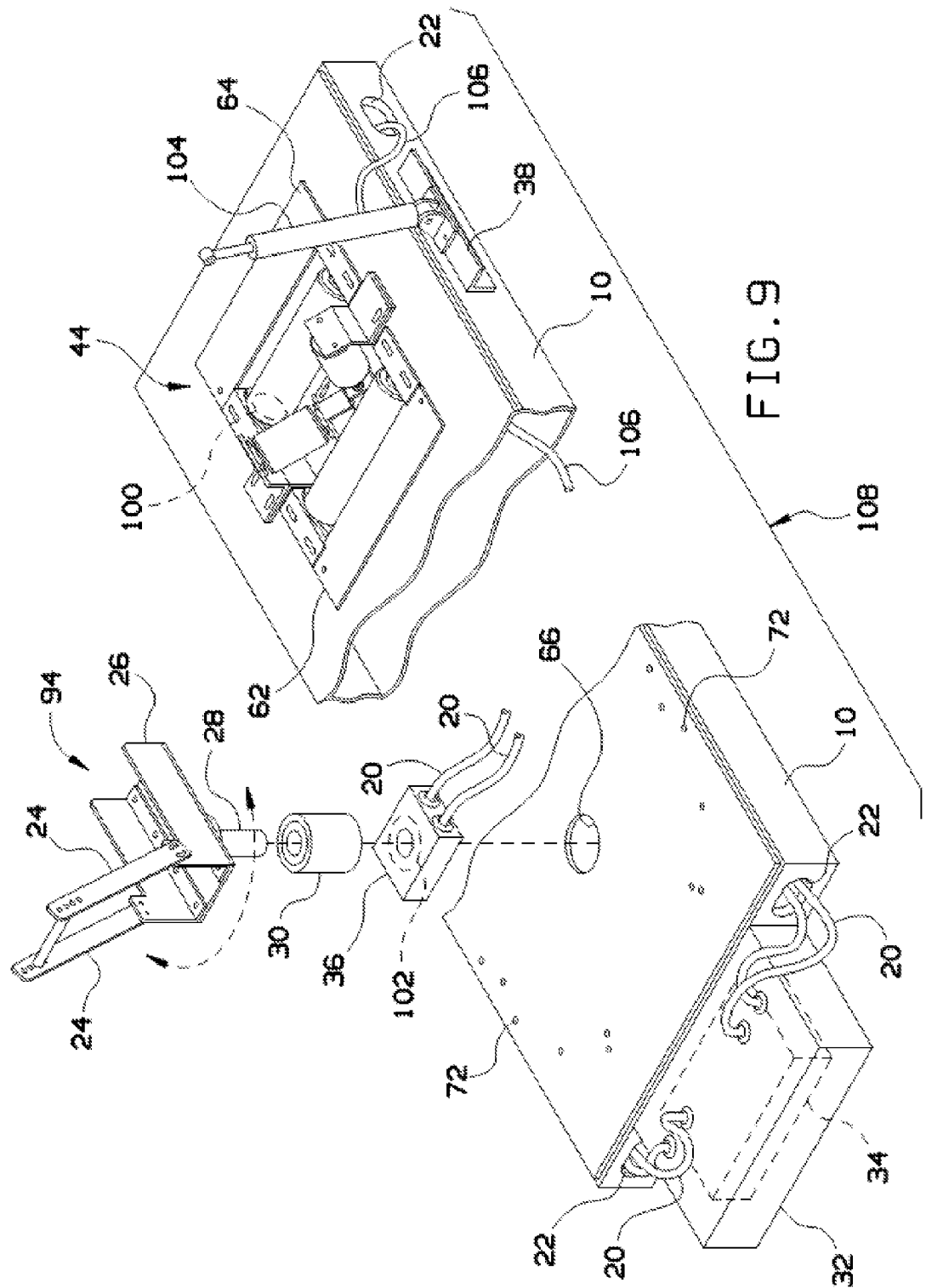
FIG. 9 conceptually illustrates a perspective view of an example stationary hydraulically assisted motorcycle training device of some embodiments showing the front wheel turret assembly 94 and a sensor equipped electronic linear actuator 104 installed.
Figure 10:
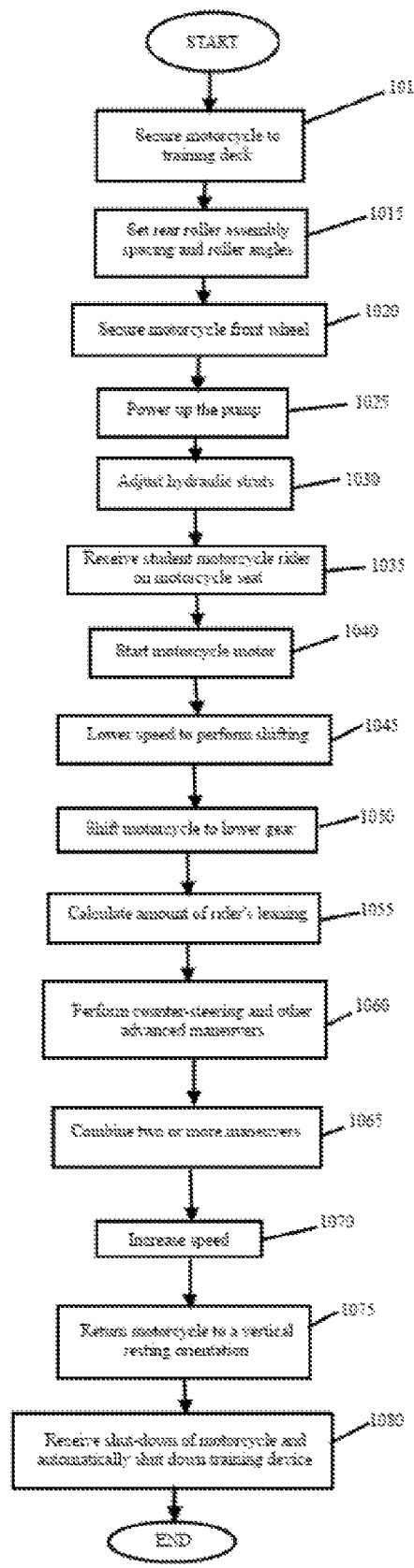
FIG. 10 shows a flow chart of one methodology of use of at least some embodiments of the present invention.

FIG. 9 conceptually illustrates a perspective view of an example stationary hydraulically assisted motorcycle training device of some embodiments showing the front wheel turret assembly 94 and a sensor equipped electronic linear actuator 104 installed.

In some embodiments . . .

A

B

C

In some embodiments . . .

Many of the above-described features are implemented as software processes that are specified as a set of instructions recorded on a computer readable storage medium (also referred to as computer readable medium). When these instructions are executed by one or more computational or processing units (e.g., one or more processors), they cause the processing units to perform the actions indicated in the instructions. Examples of computer readable media include, without limitation, CD-ROMs, flash drives, random access memory (RAM) chips, hard drives, erasable programmable read-only memories (EPROMs), electrically erasable programmable read-only memories (EEPROMs), etc. The computer readable media does not include carrier waves and electronic signals passing wirelessly or over wired connections.

The term "software" used herein is meant to include firmware residing in read-only memory or applications stored in magnetic storage which can be read into memory for processing by a processor. Also, in some embodiments, multiple software applications can be implemented as sub-parts of a larger program while remaining distinct software applications. In some embodiments, multiple software applications can also be implemented as separate applications. Finally, any combination of separate programs that implement software described here is within the scope of the invention. In some embodiments, the software programs, when installed to operate on one or more electronic systems, define one or more specific machine implementations that execute and perform the operations of the software programs.

The above-described embodiments of the invention are presented for purposes of illustration and not of limitation.

I claim:

1. A motorcycle training device comprising:
a training platform for securing a fully-operational motorcycle to a stationary position, wherein a person seated on the motorcycle performs a particular motorcycle maneuver to simulate a motorcycle riding experience;
a rear control arm, attached to the training platform and further connected to a first side of a frame on the fully-operational motorcycle with a first strut; wherein, movement of the first strut by the first control arm sets a rear orientation angle of the fully-operational motorcycle;
a front wheel turret assembly mounted to the training platform and further comprising a set of adjustable wheel safety arms and a front wheel chock wherein rotating the front wheel turret assembly rotates the front wheel chock and thus a front wheel on the fully-operational motorcycle.

2. The motorcycle training device of claim 1, further comprising a rear roller assembly, having at least four rollers; connected to the training platform a further comprising two horizontal non-resistant high speed rollers spaced equidistant from a pair of angle mounted non-resistant high speed rollers; wherein the angle mounted non-resistant high speed rollers are angled from a plane which joins the pair of angle mounted non-resistant high speed rollers.

3. The motorcycle training device of claim 1, further comprising a set of rear control arms for adjusting an orientation angle of the rear wheel, wherein the orientation angle is adjusted based on an amount of leaning the person performs on the motorcycle.

4. The motorcycle training device of claim 1 further comprising a set of sensors for (i) receiving motorcycle maneuvers performed by the person, (ii) quantifying data values for the received motorcycle maneuvers, and (iii) saving the quantified data values for review.

5. A motorcycle training device configured to simulate a motorcycle riding experience of a physically large motorcycle, the motorcycle training device comprising:
a training platform for securing a fully-operational motorcycle to a stationary position, wherein a person seated on the motorcycle performs a particular motorcycle maneuver to simulate a motorcycle riding experience;
a rear control arm, attached to the training platform and further connected to a first side of a frame on the fully-operational motorcycle with a first strut; wherein, movement of the first strut by the first control arm sets a rear orientation angle of the fully-operational motorcycle;
a front wheel turret assembly mounted to the training platform and further comprising a set of adjustable wheel safety arms and a front wheel chock wherein rotating the front wheel turret assembly rotates the front wheel chock and thus a front wheel on the fully-operational motorcycle;
and
a control system for (i) receiving motorcycle maneuver inputs from the person and (ii) directing the rear control arms to perform an operation based on the received input.

6. The motorcycle training device of claim 5, wherein the control system responds to the person's left handlebar turn by increasing the power required to steer the motorcycle to the left.

7. The motorcycle training device of claim 5 further comprising:
a rear roller assembly a rear roller assembly, having at least four rollers; connected to the training platform a further comprising two horizontal non-resistant high speed rollers spaced equidistant from a pair of angle mounted non-resistant high speed rollers; wherein the angle mounted non-resistant high speed rollers are angled from a plane which joins the pair of angle mounted non-resistant high speed rollers.

* * * * *